(12) United States Patent
Sargent

(10) Patent No.: US 7,823,925 B2
(45) Date of Patent: Nov. 2, 2010

(54) HEAD AND NECK RESTRAINT SYSTEM AND DEVICE

(76) Inventor: Leigh R. Sargent, 6042 Yellow Birch Ct., Avon, IN (US) 46123

( * ) Notice: Subject to any disclaimer, the term of this patent is extended or adjusted under 35 U.S.C. 154(b) by 0 days.

(21) Appl. No.: 12/535,754

(22) Filed: Aug. 5, 2009

(65) Prior Publication Data

US 2009/0307830 A1      Dec. 17, 2009

Related U.S. Application Data

(63) Continuation of application No. 11/526,428, filed on Sep. 25, 2006, now abandoned.

(60) Provisional application No. 60/720,517, filed on Sep. 26, 2005.

(51) Int. Cl.
*B60R 22/00* (2006.01)
(52) U.S. Cl. ................. 280/808; 2/411; 2/468; 180/274; 180/282; 297/469; 297/470
(58) Field of Classification Search .............. 280/801.1, 280/808; 2/468, 6.8, 410, 411; 180/271, 180/274, 282; 297/393, 396, 397, 464, 468, 297/469, 470, 483, 484
See application file for complete search history.

(56) References Cited

U.S. PATENT DOCUMENTS

| | | | | |
|---|---|---|---|---|
| 4,638,510 A | * | 1/1987 | Hubbard | 2/6.1 |
| 6,009,566 A | * | 1/2000 | Hubbard | 2/468 |
| 6,751,809 B1 | * | 6/2004 | Cooper et al. | 2/421 |
| 6,810,535 B1 | * | 11/2004 | Moloney | 2/411 |
| 6,931,669 B2 | * | 8/2005 | Ashline | 2/422 |
| 7,017,194 B2 | * | 3/2006 | Schroth | 2/410 |
| 7,120,982 B2 | * | 10/2006 | Downing et al. | 29/401.1 |

* cited by examiner

*Primary Examiner*—Eric Culbreth
(74) *Attorney, Agent, or Firm*—Bruce J. Bowman

(57) ABSTRACT

A head and neck restraint device controls the motion of the head and forces exerted upon the neck of a seated occupant in a decelerating vehicle. A body defines a collar, right and left legs, and right and left wings. The collar is tethered to the helmet. Each leg has belt interaction surfaces that provide a friction action on the shoulder straps. Left and right extensions or wings residing under the shoulder strap rearward of the legs provide a restriction of rotation of the body and thus a binding action on the shoulder straps. A cantilever action is induced during forward impact by the tethers pulling on the collar of the body and the binding action on the shoulder straps, thus reducing the forward motion of the body. The present restraint device does not attach to the structure of the vehicle, allows travel thereof with respect to the seated occupant, yet controls the motion of the occupant's head in order to substantially reduce neck loads on the occupant. Moreover, the present restraint device is not in contact with the occupant during normal operation and thus does not induce discomfort or fatigue. Under general forward impact conditions, the occupant's head motion is controlled with respect to the torso, yet the device will restrictively move with the driver's head and torso along shoulder straps of a seat harness of the vehicle.

21 Claims, 15 Drawing Sheets

HEAD AND NECK RESTRAINT SYSTEM AND DEVICE

CROSS-REFERENCE TO RELATED APPLICATIONS

This U.S. non-provisional patent application is a continuation of now abandoned U.S. non-provisional patent application Ser. No. 11/526,428 filed Sep. 25, 2006, entitled "Head and Neck Restraint System and Device" which claims the benefit of and/or priority to U.S. provisional patent application Ser. No. 60/720,517 filed Sep. 26, 2005, entitled "Head and Neck Restraint System and Device" the entire contents of each of which are specifically incorporated herein by reference.

BACKGROUND OF THE INVENTION

1. Field of the Invention

The present invention relates to head and neck protection devices for use by occupants of a car, aircraft, boat and/or other vehicle to aid in reducing bodily strain, fatigue and injury especially during deceleration of the vehicle.

2. Background Information

The driver and/or other occupants of high performance cars, planes, boats and/or other vehicles (collectively, "vehicles") typically wear equipment and/or gear designed to provide protection against physical harm during use of the vehicle; but especially for providing protection against physical harm during sudden or rapid deceleration, torque or impact of the vehicle. Standard pieces of such equipment and/or gear include a helmet for protection against head injury and a shoulder harness attached to the vehicle for restraining torso movement relative to the seat and vehicle.

It was long ago realized that the neck undergoes various stresses and strains during deceleration. As such, various devices have been developed in an attempt to reduce the amount of stress and strain experienced by the neck during deceleration. Various structures have been developed to transmit loads from the helmeted head to the torso in an attempt to reduce neck muscle fatigue and extreme head motions. While these devices may reduce neck muscle fatigue and extreme head motions, they may also lead to other problems.

Present head and neck devices that have proven to be effective in reducing the forces on an occupant's neck by restricting the extent of motion of the head with respect to the torso rely on a restrictive force being carried partially or fully through the torso. In these cases the occupant is effected by the head and neck device with either discomfort and/or torso restriction during normal operation.

Those devices which do not contact the occupant's torso during normal operation are typically ineffective in reducing the neck loads or are restrictive on the occupant when attempting to exit the vehicle. Those devices that are both successful in controlling head motion and that do not inhibit egress from the vehicle also have a tendency to move with the driver during impact to assure that the distance between the device and the head of the occupant does not become excessive. This, however, is not desirable.

U.S. Pat. Nos. 4,638,510 and 6,009,566 to Hubbard show a protection device that works on the principle of the body squeezing two forward arms (extensions) against the seat belts during impact by the driver's chest pushing against the underside of the arms. A frictional material is placed on the upper surface of the extensions to enhance the adherence against the seat belt. This inhibits forward motion of the device and assists in overcoming the forward forces of the tethers pulling at the top of the device by the head/helmet and by the chest and shoulders dragging on the underside of the extensions.

The device lays on the shoulders and chest of the occupant during normal operation. This however, applies an increased load from the seat belts in this area, thus causing the driver or occupant discomfort. This is undesirable both from the point of discomfort and fatigue as well as the occupant or driver may not wish to tighten the seat belts to optimum tension, thus reducing the seat belt's effect under impact events. It is also noted that during impact and actuation of the device, increased chest loads are exerted on the occupant as the end of the arms are driven into the driver's chest. Also, since the device is trapped between the driver's shoulders, chest and seat belt, during a rearward impact the device may place high loads on the upper torso of the driver or occupant.

The device firstly travels forward with the torso and head during the initial stages of an impact imparting only minimal tension on the tethers allowing the neck to initially be tensioned as the head moves forward faster than the torso which is progressively being restrained by the seat belts. It is during the forward motion of the driver's torso that the device will finally bind against the underside of the belts restricting the forward motion of the head. The torso will still be sliding underneath the device while the head is now restricted, driving the torso into the head placing the neck in a compression situation. It has been shown that these loads are below the threshold of injury in typical crash conditions, but this sequence of restraint is not optimal.

The device is a rigid structure typically made of carbon fiber composites. Many shapes and sizes need to be made to fit different size occupants or driver, as well as different seating positions.

Another head and neck restraint system/device is known as the R3 head and neck device from LFT Technologies, Inc. The R3 device is a back brace type strap device that relies solely on the torso for head movement restriction. The R3 device provides fit and comfort problems by having a rigid structural device ride down the back spinal area of the driver. This may likely have problems in a rearward impact and thus impart undue pressure points on the driver's back and spinal area. The R3 device functions by having a rigid back brace strapped to the torso with an extended upward section to which the tethers are attached.

Another head and neck restraint system/device is known as the Hutchens and Hutchens II (Hutchens') by Safety Solutions. The Hutchens' devices use many straps that are placed around the torso, crotch and upper leg area to distribute the load of the head during impact throughout the driver's body. The Hutchens' devices do not seem to restrict the head motion enough to create a significant enough difference in neck load. Under impact, the Hutchens' devices are known to put pressure on the crotch area of the driver thus possibly sustaining injury in this area. This device also provides strapping around the shoulder and upper torso area in an attempt to restrict the collar movement thus restraining head motion under impact. In similar manner to other prior art head and neck restraint systems/devices, the Hutchens' devices attempt to load the torso in an endeavor to restrict motion of the head and to lower neck loads in order to prevent injury during an impact. This device does have surfaces that reside below the shoulder harness, but there is no forward restriction of movement induced by the shoulder belts.

Still another head and neck restraint system/device is known as the SRS-1 device by G Force Racing Gear. The SRS-1 has a metal T-bar that resides underneath the shoulder belts and one central tether. The T-bar slides along with the driver and has no restriction of travel under forward impact. The driver's head rotates down and forward around the neck which is along the single tether; therefore little to no load is placed on the helmet tethers and near full load is taken by the neck.

Yet another head and neck restraint system/device is known as the White device. The White device is a strap device that attempts to restrict forward head motion during frontal impact by placing the loads through the torso. Again, the tethers coming from the shoulder area are at the pivot point of the neck and thus do little to restrict the forward head motion; thus the likelihood of a neck injury is not reduced.

A further head and neck restraint system/device is known as the Wright device. The Wright device comes in three distinct styles. One style is an inertia wheel tethered to the chassis. This inhibits exiting the vehicle and has been shown to induce very large compression loads on the neck above 4000N. The second style is strapped to the body. The third style is strapped to the shoulder harness. These attachment points do not slide along the shoulder harness and are permanent. This has the potential of inducing large compression loads into the neck by restricting forward head movement too much in large frontal impacts. The device also cannot adjust the point of forward restriction respective to the amount of torso movement. This third type of attachment also restricts the driver's ability to exit the vehicle.

A yet further head and neck restraint system/device is known as the Isaac. This device runs along the shoulder harness doing little to lower forward head motion. It has two metal pieces, one for the left shoulder and one for the right shoulder harness. Although there is an upper and lower surface, they do not act in a cantilever action. The upper surface is used only under normal operation while the lower surface is used during impact but runs along the shoulder strap doing little to restrict head movement. This device uses small shock absorbers instead of nylon webbing tethers.

It is therefore apparent from the above discussion that there are problems and/or deficiencies in prior art head and neck restraint systems/devices.

In view of the above, it is apparent that there is a need for a better head and neck restraint system/device.

In view of the above, it is also apparent that there is a need for a head and neck restraint device/system that overcomes the problems of the prior art.

In view of the above, it is further apparent that there is a need for a head and neck restraint system/device that is both effective in restricting head motion with respect to the body in order to lower neck forces below injury level during typical impacts, yet not inhibit nor discomfort the driver during normal operation.

In view of the above, it is still further apparent that there is a need for a head and neck restraint system/device that is not attached to the driver's torso so as not to be effected by the device during normal operation, nor be affixed to the chassis or other features of the vehicle so that exiting the vehicle is not inhibited or made more difficult.

SUMMARY OF THE INVENTION

The present invention is a head and neck restraint system, method and device (collectively, device) for controlling motion and forces exerted upon the head and neck of an occupant seated in a decelerating vehicle.

The present head and neck device does not attach to the structure of the vehicle, allows travel thereof with respect to the seated occupant, yet controls the motion of the occupant's head in order to substantially reduce neck loads on the occupant. The present invention is not in contact with the occupant during normal operation and thus does not induce discomfort or fatigue. Under general forward impact conditions, the occupant's head motion is controlled with respect to the torso, yet the device will restrictively move with the driver's head and torso along shoulder straps of a seat harness of the vehicle. The present invention thus reduces substantial compression on the neck due to the head being overly restrained when in deceleration.

The present invention has both the advantage of not imparting loads directly on the torso during normal operation of the vehicle nor does it apply loads to the torso during impact when the device is providing restriction of movement to the occupant's head with respect to his torso.

The present invention does not utilize the torso to control head movement nor is it trapped between the torso and seat belts. It does not impart loads to the chest in a generally forward impact nor does it impart loads on the upper torso, shoulder or neck area in rearward impacts. The device does not restrict the tension of the seat belts during occupant entry and thus allows for normal use of the seat belts. The sequential loading of the helmet tethers of the present head and neck restraint system, reduces the tension/compression scenario. The present invention then has the unique ability at a predetermined tether load to restrictively slide forward with the driver inducing a more stable loading on the helmet tethers thus allowing the head to move forward with limited restraint with respect to the torso reducing the neck compression in the later stages of the impact.

The present invention provides a one size fits most, if not all, occupant sizes and seating positions and accepts changes in tether angle with regard to shoulder distance to helmet tether attachment. This distance is not critical in the performance of the present invention.

The functionality of the present invention does not rely on the occupant's torso in restricting head motion during deceleration or impact. The present head and neck restraint device provides the above mentioned functions and/or movements through restrictive pivoting of the device through a binding of the device on the occupant's shoulder harness.

The present invention uses a rotation or twisting action on the shoulder harness straps due to a cantilever motion being applied by the exertion of the helmet tethers being loaded by the forward motion of the occupant's helmet, which causes a binding of the shoulder harness between upper and lower surfaces of the device which then restricts the motion forward. Due to the shape, surface area and material type of both the upper and lower surfaces of the present invention, the type and magnitude of motion can be designed to best reduce the load on the occupant's neck thus minimizing the likelihood of injury.

The present invention utilizes the shoulder harness straps to restrict the forward motion of the head. The present invention is not permanently attached to the vehicle but resides in a relaxed state in normal operation of the vehicle. It also allows for quick exit as the shoulder harness straps fall away from and out of the slots of the device when the occupant unbuckles the harness. Forward motion of the present device is controlled by friction surfaces and/or configured surfaces that contact the harness straps so that in larger impacts the motion of the device relative to the harness straps is great, while in smaller impacts, the motion of the device relative to the harness straps is less. Thus, the present invention has the ability to travel generally with the torso and thus does not induce adversely high compression loads in the neck at high forward impacts (e.g. 50 G).

The present invention has a controlled resistive forward motion that applies a progressive load on the tethers even with varying impact loads. It uses a twisting or binding action upon the shoulder harness straps to induce a controlled friction. Such action is enhanced by three separate surfaces; two for orientation on the top of the strap and one for orientation on the bottom of the strap.

The present invention does not impart pressure points or undue loads to the occupant's upper torso during rearward or forward impacts, yet inhibits head movement with respect to the torso under general forward impacts to the extent that the occupant's neck loads are reduced.

The present device rides behind the occupant's shoulder and forward of the attachment points of the shoulder belts. The device straddles the shoulder belts and has a forward section that resides on the top surface of the shoulder belts slightly to the rear of the occupant's shoulder and a lower section that resides under the seat belt aft of the upper section. The present device has a vertical section above the two mentioned surfaces that tethers, or by a single tether, is attached to or resides at or on the rearward surface. The present device uses both frictional forces on the upper and lower surfaces as well as a cantilever system that applies a twisting action on the belt. This twisting action along with the friction of the upper and lower surfaces of the device provides a resistance to the forward motion of the device, thus controlling the motion of the head with respect to the torso without the need of loads being imparted to the occupant's torso.

The action of the present device in the cantilever motion and consequential friction against the seat belts is further controlled by three means. The first means is the type of surface of the lower and upper portions of the device that are in contact with the shoulder harness belts; the second being a secondary surface edge on the upper surface that is forward of the primary frictional surface which controls the amount of forward roll and consequential twist on the device; and third the ratio of the distance between the two opposing upper and lower surfaces and the distance to the tether attachment points.

Another feature of the present invention is a single, dual attachment tether. The present invention may comprise a single tether attached at each of its ends to the helmet and looped around a rear vertical section of the device. This provides the benefits of allowing the occupant a higher degree of lateral rotation of the head for improved peripheral vision, allows for shorter tethers that will assist in take up during forward impact, and reduce the slippage which takes place in prior art forms of tether attachments. The present invention will be more apparent upon reading the following detailed description in conjunction with the accompanying drawings.

BRIEF DESCRIPTION OF THE DRAWINGS

The above mentioned and other features, advantages and objects of this invention, and the manner of attaining them, will become apparent and the invention itself will be better understood by reference to the following description of embodiments of the invention taken in conjunction with the accompanying drawings, wherein.

Like reference numerals indicate the same or similar parts throughout the several figures.

DETAILED DESCRIPTION OF PREFERRED EMBODIMENTS

In FIGS. 1-4, there is depicted various views of an exemplary embodiment of a head and neck restraint device, generally designated 100, that is used to control forces exerted upon an occupant seated in a moving vehicle especially during deceleration of the vehicle. More especially the head and neck restraint device 100 is designed to control forces exerted upon the seated occupant during rapid deceleration of the vehicle such as during an impact. The present head and neck restraint device 100 is useable with cars, aircraft and boats (collectively, vehicles), but especially with all types of high performance vehicles such as race cars. The head and neck restraint device 100 may also be used in conjunction with seated and non-seated static or moving rides such as may be used in amusement parks or other places. As apparent, the head and neck restraint device 100 may be used in various other types of devices.

Figure 5:
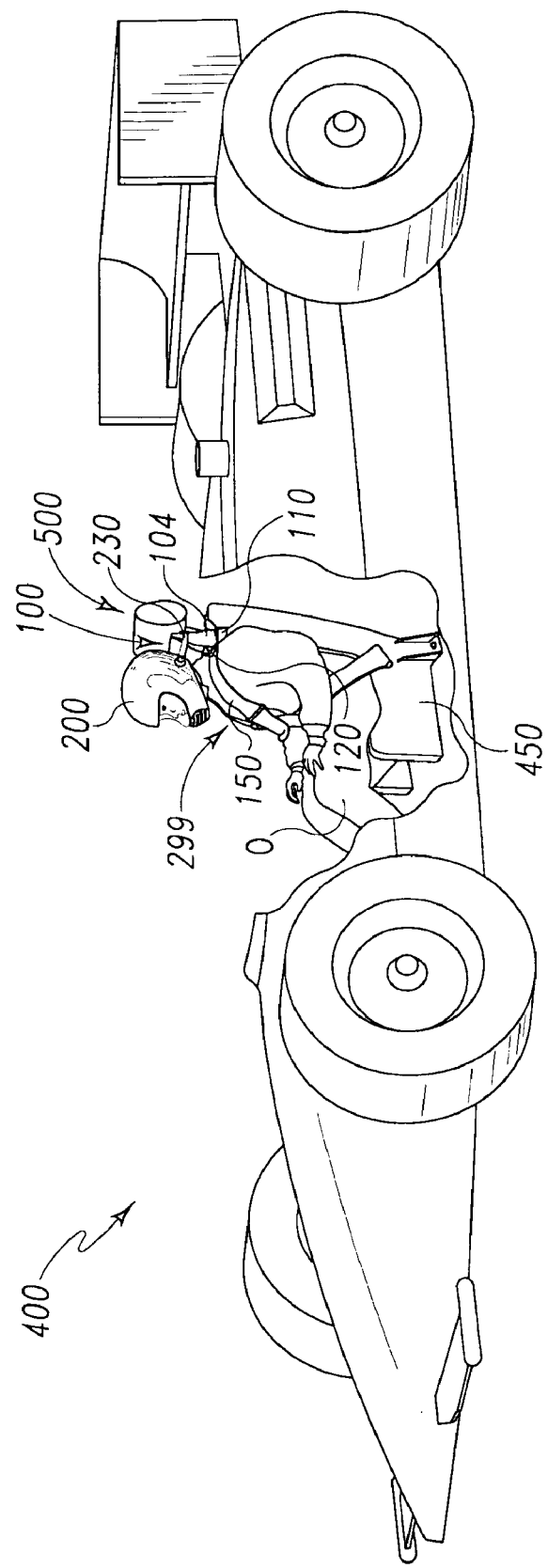
FIG. 5 is a left front side perspective view of a racing vehicle in partial cutaway showing a seated driver of the racing vehicle wearing the head and neck restraint device of FIG. 1 as installed in the racing vehicle, the left side relative to the driver of the racing vehicle.
Figure 6:
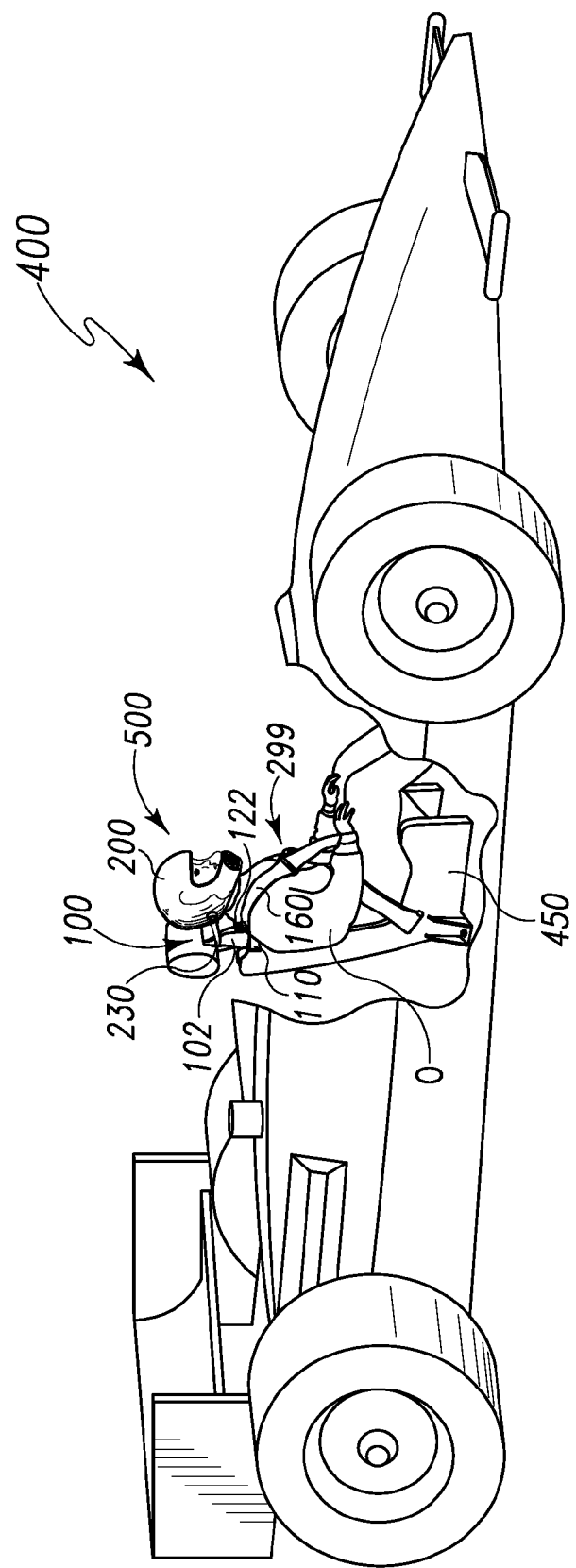
FIG. 6 is a right side perspective view of a racing vehicle in partial cutaway showing a seated driver of the racing vehicle wearing the head and neck restraint device of FIG. 1 as installed in the racing vehicle, the right side relative to the driver of the racing vehicle.

An example of use of the head and neck restraint device 100 in a high performance car is depicted in FIGS. 5 and 6. In FIGS. 5 and 6, a race car 400 is illustrated in partial cutaway showing an occupant O (e.g. the driver) seated in a seat 450 of the race car 400. The seat 450 is equipped with a seat harness 299 configured to retain and restrain movement of the occupant in the seat. The head and neck restraint device 100 is associated with and utilizes the seat harness 299 for use and operability. This combination may be defined as a head and neck restraint system 500 and form at least a part of the present invention. As discerned in FIGS. 5 and 6, a helmet tether 230 that is detachably attached to opposite sides of a helmet 200 of the occupant O is retained by and about the head and neck restraint device 100. Particularly, and as better discerned in FIGS. 7 and 8, the head and neck restraint device 100 is intertwined with left and right (as viewed by the occupant O) shoulder straps 150 and 160. It should be appreciated that the term left and right are to be taken relative to the forward view of the occupant O.

The head and neck restraint device 100 is preferably made out of a composite or similar material, but may be made of one or more other types of materials as desired. The device 100 is defined generally by a body 101. The body 101 has a back 134, a left sidewall 102 extending out from the back 134, and a right sidewall 104 extending out from the back 134 and spaced approximately a shoulder's width apart from the left sidewall 102. The left sidewall 102 defines a contoured front surface 103 and a contoured bottom surface 106. The right sidewall 104 defines a contoured front surface 105 and a contoured bottom surface 108. The body 101 is thereby configured to partially surround the neck and head areas of the occupant O. Particularly, when the device 100 is used, the back 134 of the body 101 is situated behind the occupant's head and is thus oriented essentially co-axial with the occupant's spine, the left sidewall 102 extends essentially transverse to and along the length of the left side of the back 134 and is thus oriented essentially along and/or adjacent the left side of the occupant's neck, and right sidewall 104 extends essentially transverse to and along the length of the right side of the back 134 and is thus oriented essentially along and/or adjacent the left side of the occupant's neck. The left and right sidewalls 102, 104 may be outwardly contoured as desired.

The bottom surfaces 106 and 108 are friction and shoulder belt contacting surfaces and as such, each bottom surface 106, 108 is slightly rounded or curved to provide a pivot point for a cantilever or rocking action of the device 100 per the principles of the present invention. Bottom surface curvature configuration determines the pivot point of the device 100 as well as the extent of forward and reverse pivoting thereof. The bottom surfaces 106 and 108 preferably, but not necessarily, have a width that is approximately the same as the width of seat harness shoulder straps.

The body 101 has a left side extension 120 that is situated on the lower part of the front surface 103 of the left sidewall 102, and a right side extension 122 that is situated on the lower part of the front surface 105 of the right sidewall 104. The right and left extensions 122, 120 may or may not be moveable (adjustable) up and down relative to the sidewalls 102, 104 (as represented by the double-headed arrows adjacent the extensions) as desired. The extensions 120, 122 are shown as adjustable.

As such, the left side extension 120 is adjustably connected to the lower portion of the front surface 103. The left side extension 120 is adjustably connected to the front surface 103 through interaction of bolt and slot assemblies 124, 125. In this embodiment, the bolt portion is part of the left sidewall 102 while the slots are part of the left side extension 120. The left side extension 120 includes a contoured bottom surface 128 that defines a belt contacting surface being preferably, but not necessarily, approximately the same width as the left shoulder strap 150. Up/down adjustability of the left side extension 120 provides up/down adjustability in the distance between the bottom surface 128 of the left side extension 120 and the bottom surface 106 of the left sidewall 102. This affects forward pivoting of the device 100.

Moreover, the right side 122 is adjustably connected to the lower portion of the front surface 105. The right side extension 122 is adjustably connected to the front surface 105 through interaction of bolt and slot assemblies 126, 127. In this embodiment, the bolt portion is part of the right sidewall 104 while the slots are part of the right side extension 122. The right side extension 122 includes a contoured bottom surface 130 that defines a belt contacting surface being preferably, but not necessarily, approximately the same width as the right shoulder strap 160. Up/down adjustability of the right side extension 122 provides up/down adjustability in the distance between the bottom surface 130 of the right side extension 122 and the bottom surface 108 the right sidewall 104. This affects forward pivoting of the device 100.

The height of the surface 128 relative to the surface 106, and the height of the surface 130 relative to the surface 108 (ratio thereof) limits the amount of load, grip or holding of the device 100 on the shoulder straps 150, 160 before the device 100 pivots (cantilevers) forward and moves with the occupant during deceleration. The device 100 moves while maintaining its pivot or cantilever angle. Typically and preferably, but not necessarily, the two extensions 120 and 122 are adjusted for the same height. Surfaces 128 and 130 may be deemed cantilever surfaces in that the height or ratio of the height of these surfaces relative to their associated surfaces 106 and 108 determines when the device 100 will stop, pivot and interact with the shoulder straps 150, 160.

The device 100 further includes a belt interaction portion 110 that extends outwardly from the left and right sides of the back or center portion 134 of the body 101. The left and right side extensions of the belt interaction portion 110 each have a contact surface 112 on a respective upper area thereof. This contact surface 112 is a friction and binding area and is adapted to receive and contact a shoulder strap 150, 160 over the left and right extensions respectively. The left sidewall 102 of the body 101 has a cutout area 113. The cutout area 113 defines a strap space for receiving and guiding the left strap 150 therethrough and over the left side extension, thereby directing the strap 150 thus between the contact surface 112 of the left side extension and the bottom surface 106 of the left sidewall 102. Likewise, the right sidewall 104 of the body 101 has a cutout area 115. The cutout area 115 defines a strap space for receiving and guiding the right strap 160 therethrough and over the right side extension, thereby directing the strap 160 thus between the contact surface 112 of the right side extension and the bottom surface 108 of the right sidewall 104.

Figure 1:
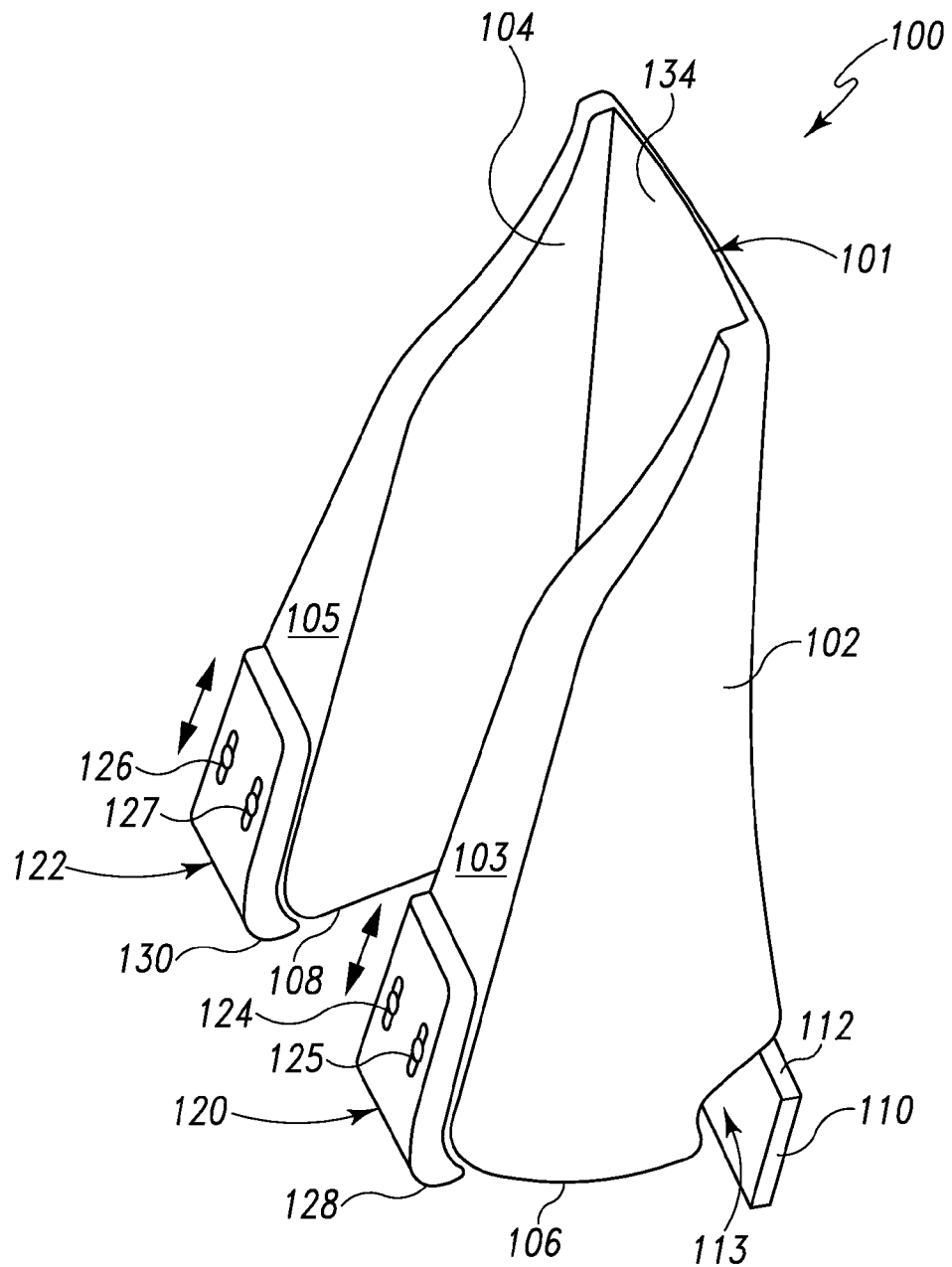
FIG. 1 is a left front side perspective view of an exemplary embodiment of a head and neck restraint device fashioned in accordance with the principles of the present invention, the left side perspective view relative to a user of the head and neck restraint device.
Figure 2:
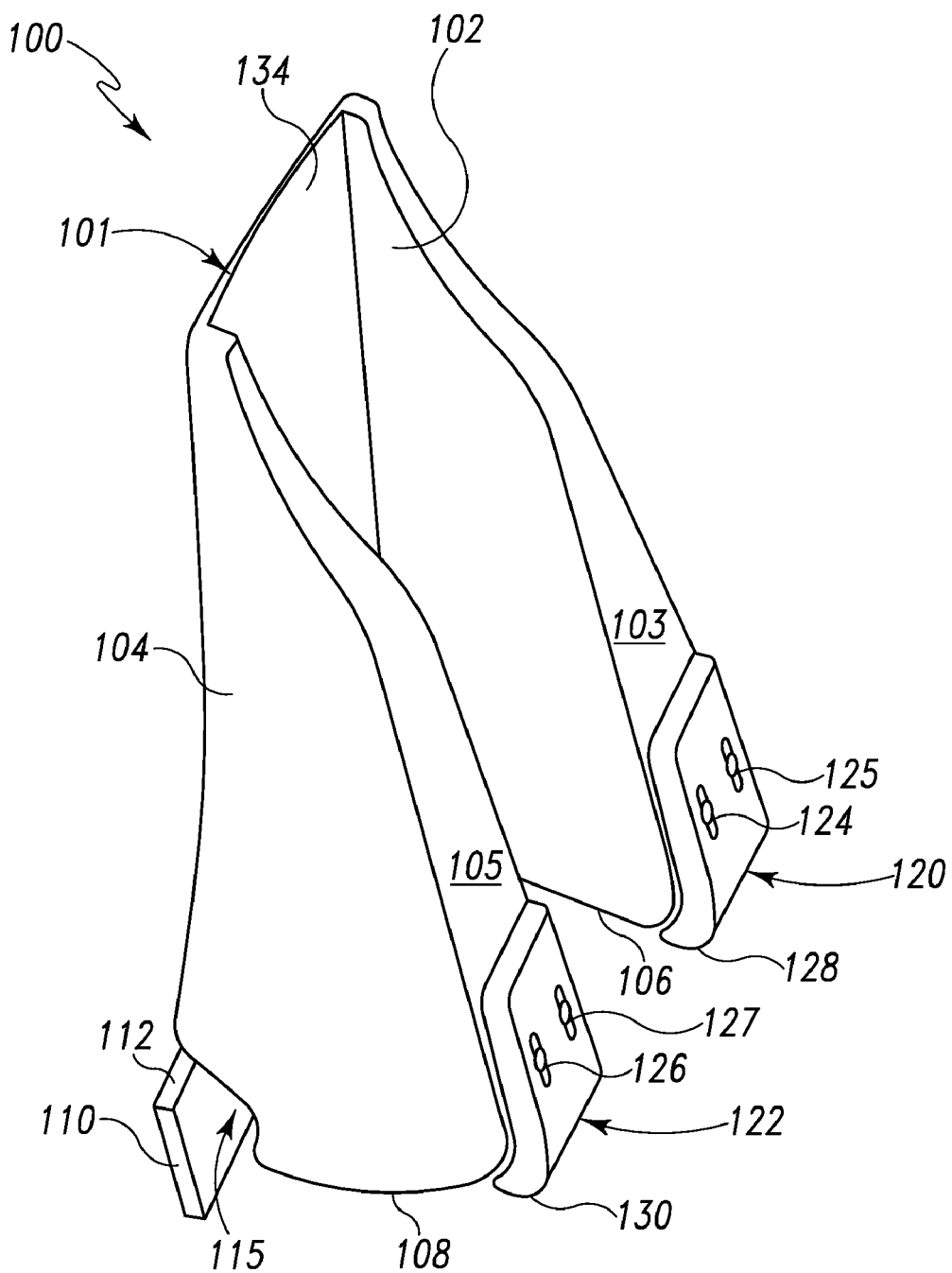
FIG. 2 is a right front side perspective view of the head and neck restraint device of FIG. 1, the right side relative to a user of the head and neck restraint device.
Figure 3:
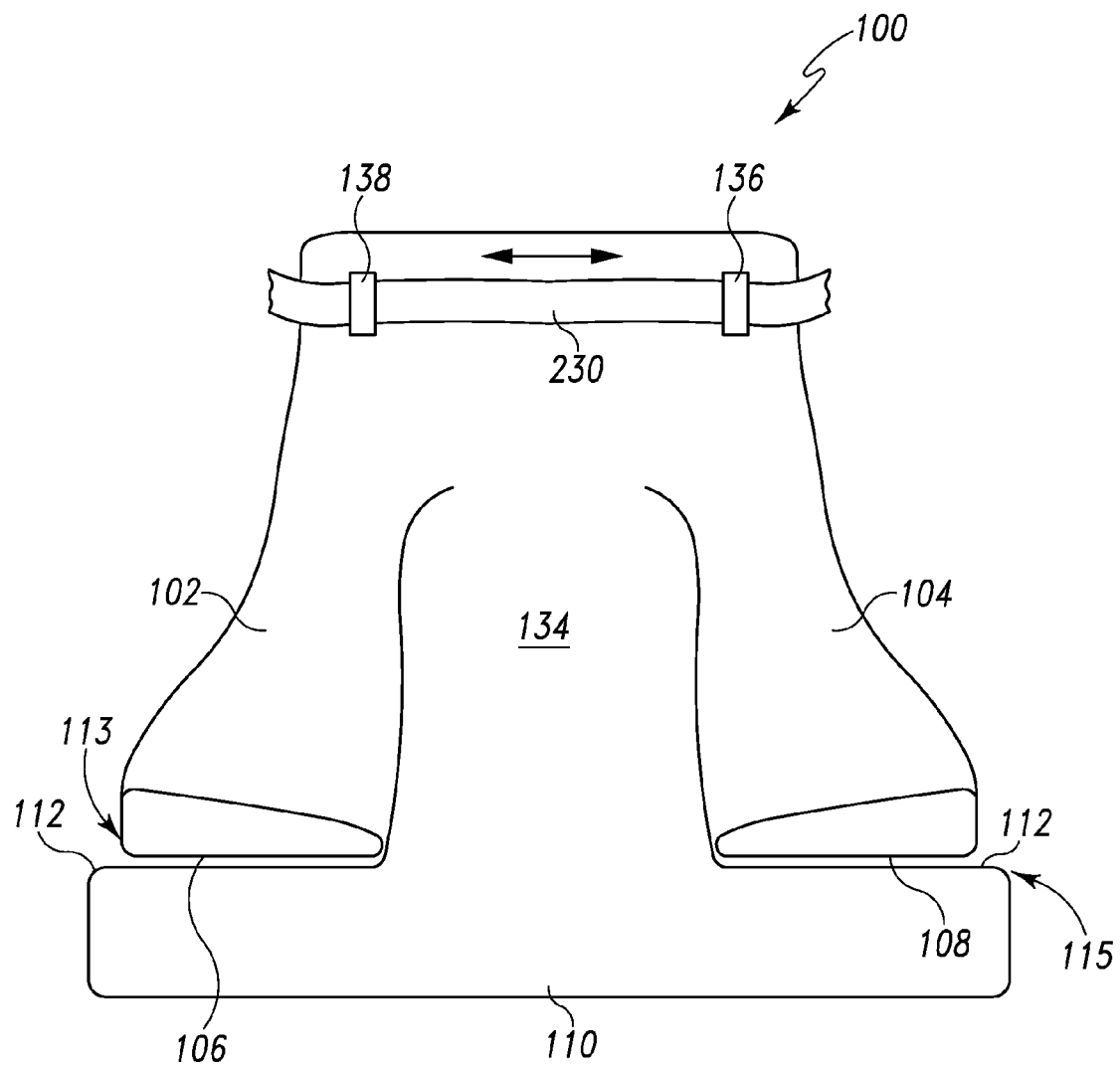
FIG. 3 is a rear view of the head and neck restraint device of FIG. 1 showing a helmet strap or tether slidably received in brackets of the head and neck restraint device.
Figure 8:
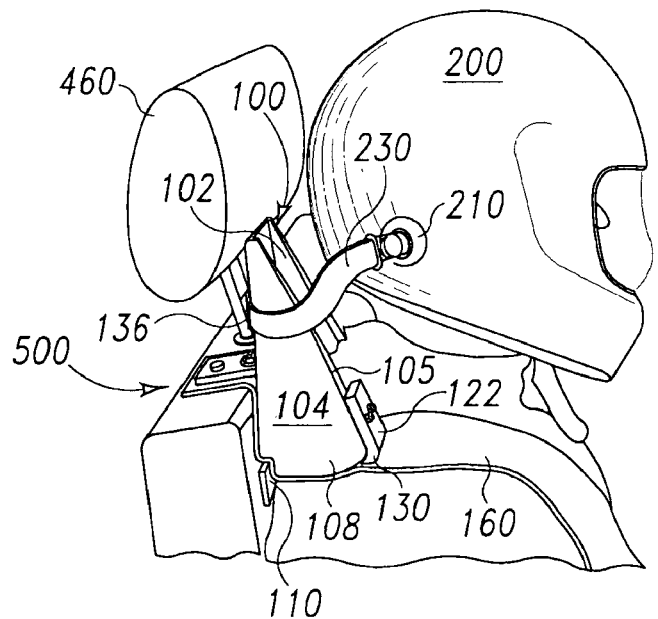
FIG. 8 is a close-up front right side perspective view of the seated driver of FIGS. 5 and 6 particularly showing the position of the head and neck restraint device on the shoulder straps of the safety harness of the racing vehicle and relative to the helmeted head and neck of the driver during use.
Figure 9:
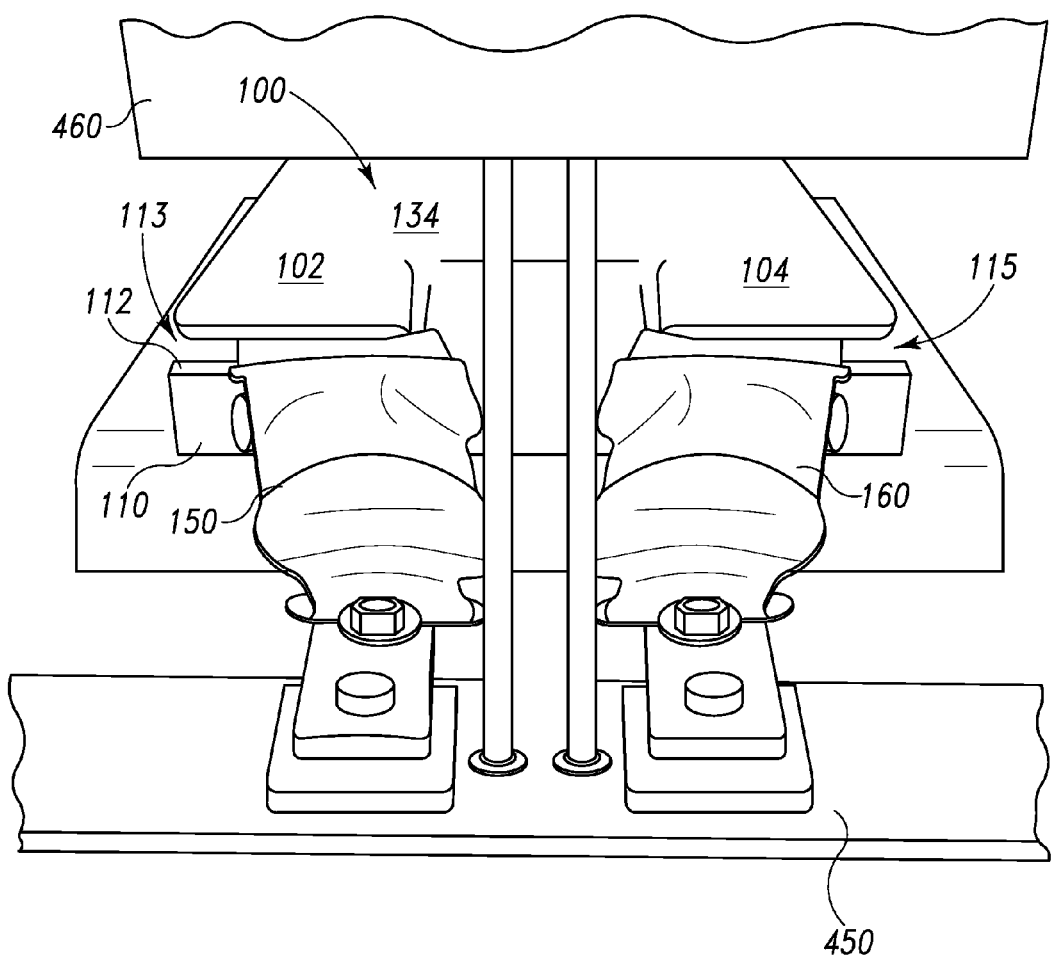
FIG. 9 is a close-up rear view of the head and neck restraint device as shown in FIGS. 7 and 8 as positioned on the seated driver and showing the manner in which the shoulder straps of the safety harness of the racing vehicle extend through the device and are attached to the seat of the racing vehicle.
Figure 10:
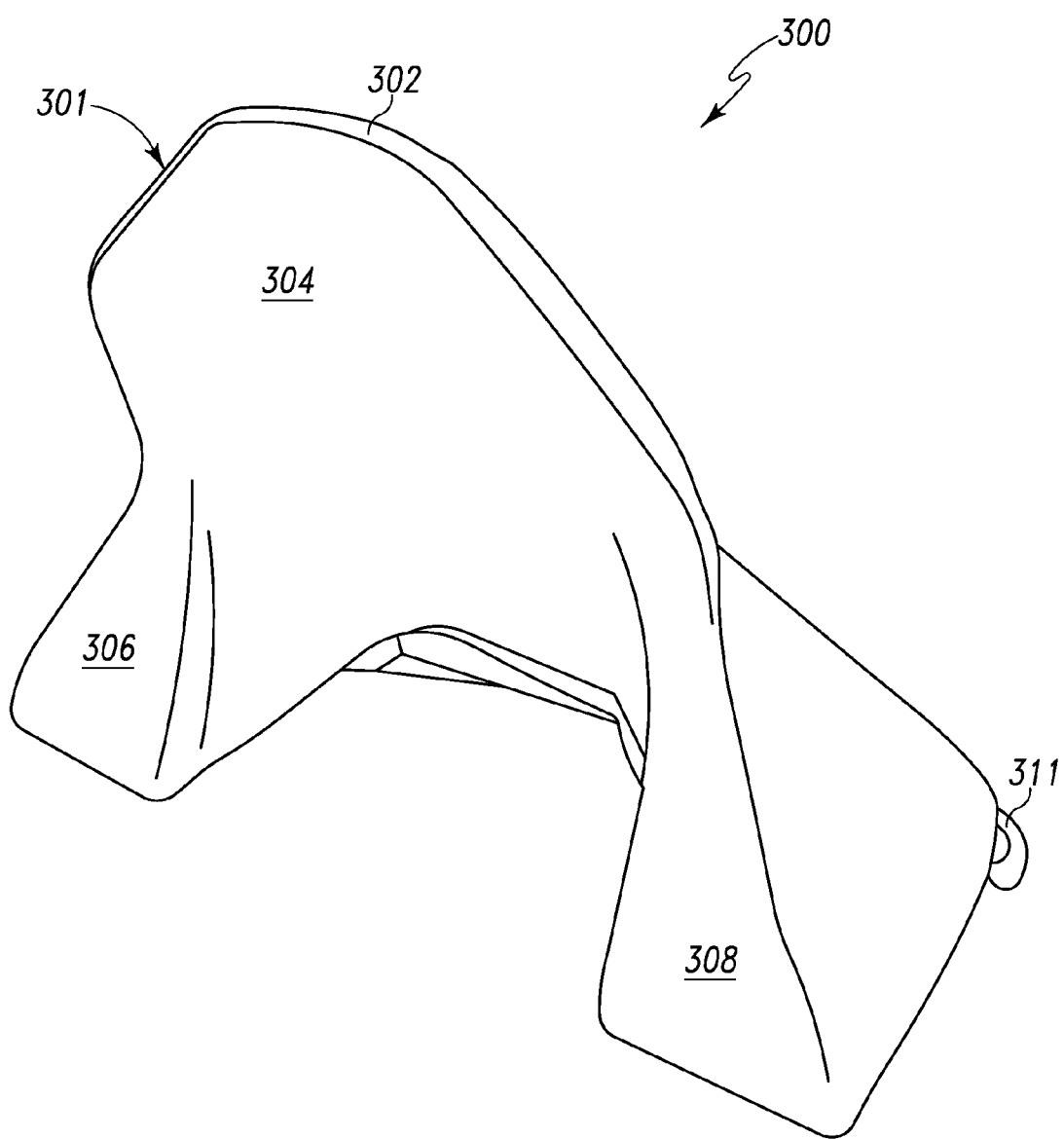
FIG. 10 is an upper front left side perspective view of another exemplary embodiment of a head and neck restraint device fashioned in accordance with the principles of the present invention, the left side relative to a user of the head and neck restraint device.

FIGS. 3 and 9 depict rear views of the head and neck restraint device 100 and additional attention is directed thereto. Particularly, FIG. 3 depicts the head and neck restraint device 100 by itself while FIG. 9 depicts the head and neck restraint device 100 as situated during use and as a rear view of FIGS. 7 and 8. These views show the gap or areas 113 and 115 between the left and right extensions of the belt interaction portion 110 through which the respective straps 150, 160 extend. Since the ends of the extensions are open, this allows easy lateral insertion and removal of the respective shoulder straps onto the device 100. While not shown, the extensions may have belt retention portions extending from their contact surface 112 to aid in releasably retaining the shoulder straps thereon.

FIG. 3 additionally depicts a single helmet tether 230 extending through retention portions or brackets 136 and 138 on the back side of the body 101. This tether is releasably connected at a left end to a left connector 212 of the helmet 200 (see e.g. FIGS. 4 and 7) and releasably connected at a right end to a right connector 210 of the helmet 200 (see e.g. FIG. 8). The tether is angled upwardly from the device to the helmet. This aids in providing the necessary cantilever action with respect to the device. In this manner, the helmet 200 is connected to the device 100. The length of the tether 230 determines the maximum outward (forward) length of travel for the helmet 200 relative to the device 100. The longer the tether the greater the length of travel for the occupant's helmet relative to the device and visa versa. The length of travel determines actuation of the cantilever motion. The retention portions 136, 138 of the body 101 allow the tether 230 to move freely therethrough, thereby allowing side-to-side head motion by the occupant O (as represented by the double-headed arrow) regardless of the maximum length of travel for the tether. Thus, as the restraint helmet 200 moves from side to side, the tether may move with it. Other configurations for retention portions are contemplated.

Figure 4:
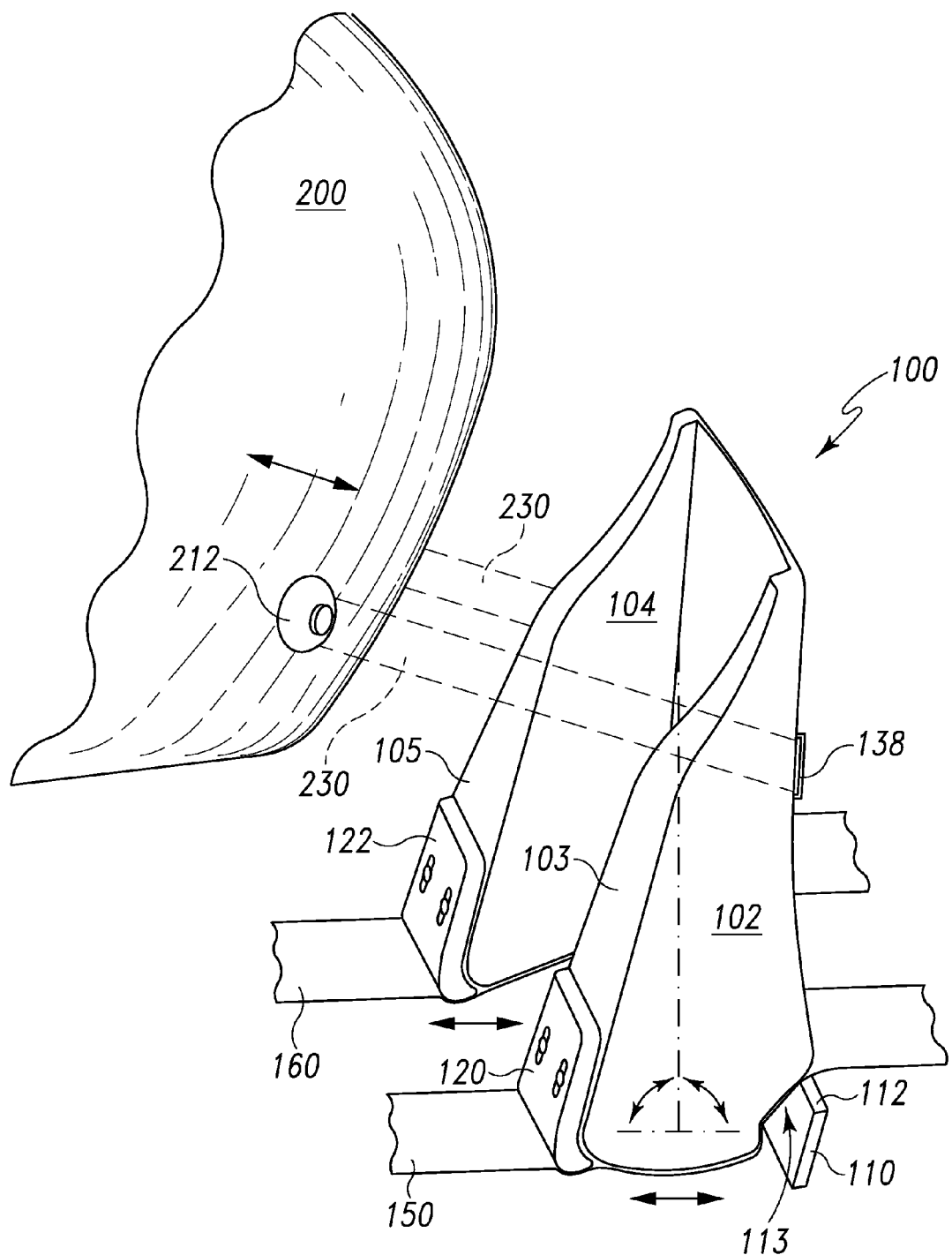
FIG. 4 is a left front side perspective view of the head and neck restraint device of FIG. 1 illustrating various features and functions of the present invention such as the manner in which straps of a shoulder harness are received by the present head and neck restraint device, directions of movement of the head and neck restraint device relative to the shoulder harness straps, and the manner in which helmet tethers are received by the head and neck restraint device.

FIG. 4 provides a close-up perspective view of the present head and neck restraint device 100 in relation to shoulder straps 150 and 160, and an occupant's restraint helmet 200 particularly illustrating the various moments, forces, motions, dynamics and/or the like of the present invention as represented by the arrows and any associated lines. Shoulder strap 150 is positioned over the belt interaction portion 110 (side or lateral placement onto surface 112) and under the extension 102 and plate 120. Likewise, the shoulder strap 160 is positioned over the belt interaction portion 110 (side or lateral placement onto the surface 112) and under the extension 104 and plate 122.

The device 100 may move forward and back along the shoulder straps as represented by the double-headed arrows below the extensions 102 and 104. The device 100 also tilts, pivots or provides a cantilever action as represented by the dashed lines and angled double-headed arrows. The relationship of the tether 230 to the device is also illustrated by dashed line-tether 230.

Figure 7:
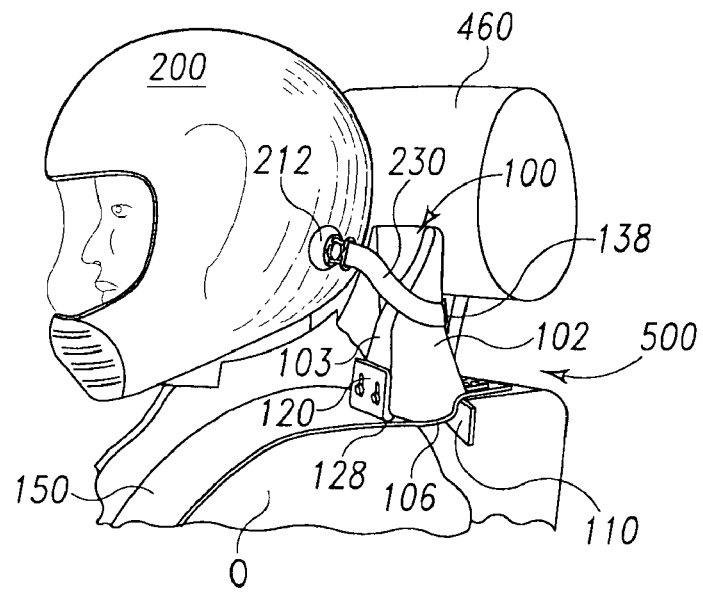
FIG. 7 is a close-up front left side perspective view of the seated driver of FIGS. 5 and 6 particularly showing the position of the head and neck restraint device on shoulder straps of a safety harness of the racing vehicle and relative to the helmeted head and neck of the seated driver during use.

In FIG. 7 there is depicted the left side of the head and neck restraint system 500 using the head and neck restraint device 100. The helmet tether 230 is shown connected to the connector 212 of the restraint helmet 200. The shoulder strap 150 is shown extending over the shoulders of the occupant O, under the surface 128 of the adjustment plate 120, under the friction surface 106 of the left sidewall 102, and over the surface 112 of the belt interaction portion 110.

In FIG. 8 there is depicted the right side of the head and neck restraint system 500 using the head and neck restraint device 100. The helmet tether 230 is shown connected to the connector 210 of the restraint helmet 200. The shoulder strap 160 is shown extending over the shoulders of the occupant O, under the surface 130 of the adjustment plate 122, under the surface 108 of the right sidewall 104, and over the surface 112 of the belt interaction portion 110.

It can thus be deduced that when the body moves forward during impact or deceleration, the head, through helmet 200 and tether 230 pulls the upper portion of the device 100. The device 100 will move along the shoulder straps 150, 160 by the pulling of the upper portion as the head and body move forward. Depending on the friction of the surfaces 106, 108, 112, 128 and 130 the device 100 will move along the straps 150, 160 until a frictional point is reached and the device 100 pivots or provides a cantilever action.

FIGS. 10-14 depict various views of another exemplary embodiment of a head and neck restraint device, generally designated 300. The head and neck restraint device 300 is formed as a one piece body 301. Preferably, but not necessarily, the body 301 is formed of a composite material or as a composite structure. This makes the device lightweight and durable.

The body 301 has a back 302 defining a collar portion 304, a right leg 306 and a left leg 308. The right leg 306 is contoured to define a right belt surface 360 (see e.g. FIG. 14). The left leg 308 is contoured to define a left belt surface 350 (see e.g. FIG. 14). When the device 300 is used, the collar portion 304 is situated behind the occupant's head and is thus oriented essentially co-axial with the occupant's spine, the left leg 308 is oriented essentially along and/or adjacent the left side of the occupant's neck or over the left shoulder, and the right leg 306 is oriented essentially along and/or adjacent the right side of the occupant's neck or over the right shoulder. The left and right legs 308, 306 may be outwardly contoured as desired.

The bottom surfaces 350 and 360 of the legs 308, 306 are friction and shoulder belt contacting surfaces and as such, each bottom surface 350, 360 is contoured to provide a pivot point for a cantilever or rocking action of the device 300 per the principles of the present invention. Bottom surface curvature configuration determines the pivot point of the device 300 as well as the extent of forward and reverse pivoting thereof. The bottom surfaces 350, 360 preferably, but not necessarily, have a width that is approximately the same as the width of seat harness shoulder straps. In one form, the widths are larger than the strap. In another form, the widths are smaller than the strap.

Figure 14:
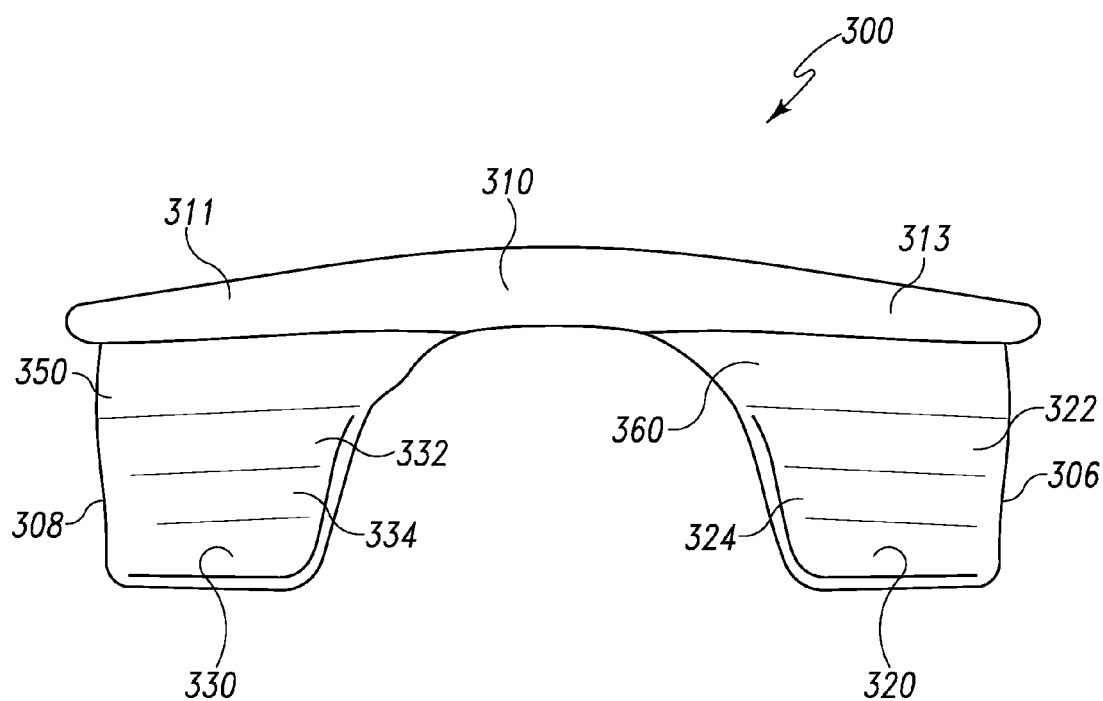
FIG. 14 is a bottom view of the head and neck restraint device of FIG. 10.

With attention directed to FIG. 14, the bottom surface 350 of the left leg 308 has a double ridge configuration defining a trough therebetween. Particularly, the bottom surface 350 has a stop ridge 330 that extends essentially transverse to a forward/reverse direction of the body 301 and a pivot ridge 332 that extends essentially transverse to the forward/reverse direction of the body 301. The stop ridge 330 and the pivot ridge 332 defines a transverse trough 334 situated between the ridges. The height of the ridges relative to one another defines the amount of forward pivot of the device 300. Particularly, the height of stop surface 330 relative to the pivot surface 332 limits the amount of load/grip the device 300 exhibits (holding) before the device tilts or pivots and then moves.

The bottom surface 360 of the right leg 306 likewise has a double ridge configuration defining a trough therebetween. Particularly, the bottom surface 360 has a stop ridge 320 that extends essentially transverse to a forward/reverse direction of the body 301 and a pivot ridge 322 that extends essentially transverse to the forward/reverse direction of the body 301. The stop ridge 320 and the pivot ridge 322 define a transverse trough 324. Particularly, the height of stop surface 320 relative to the pivot surface 322 limits the amount of load/grip the device 300 exhibits (holding) before the device tilts or pivots and then moves.

The device 300 further includes a belt interaction portion 310 that extends down from the bottom of the back 302 and outwardly from the left and right sides thereof. The belt interaction portion 310 has a left wing 311 and a right wing 313 each having a contact surface 312a, 321b on a respective upper area thereof. These contact surfaces 312a, 312b are a friction and binding areas and are adapted to receive and contact a shoulder strap over the left and right wings.

Figure 11:
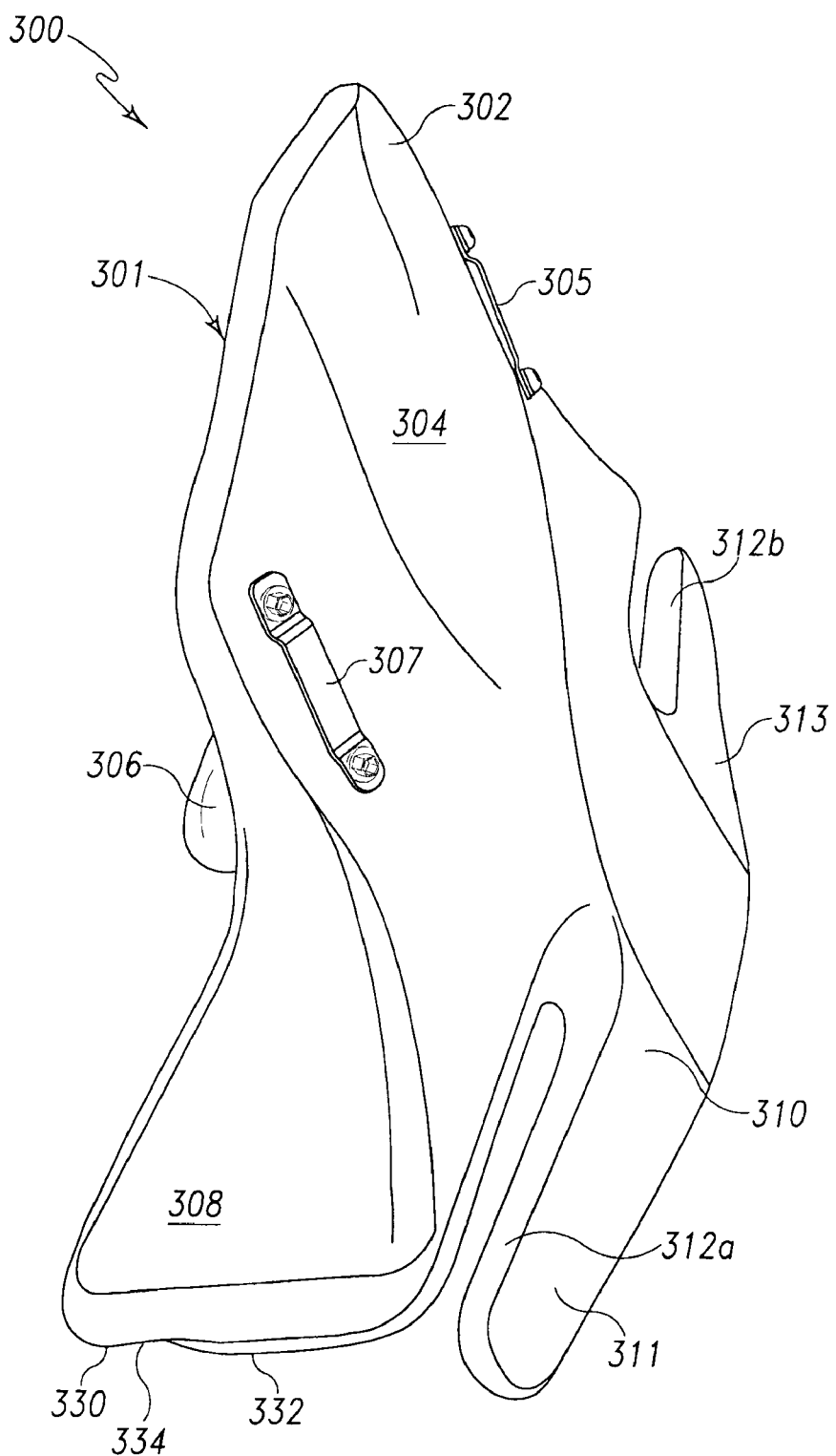
FIG. 11 is an upper rear left side perspective view of the head and neck restraint device of FIG. 10.
Figure 12:
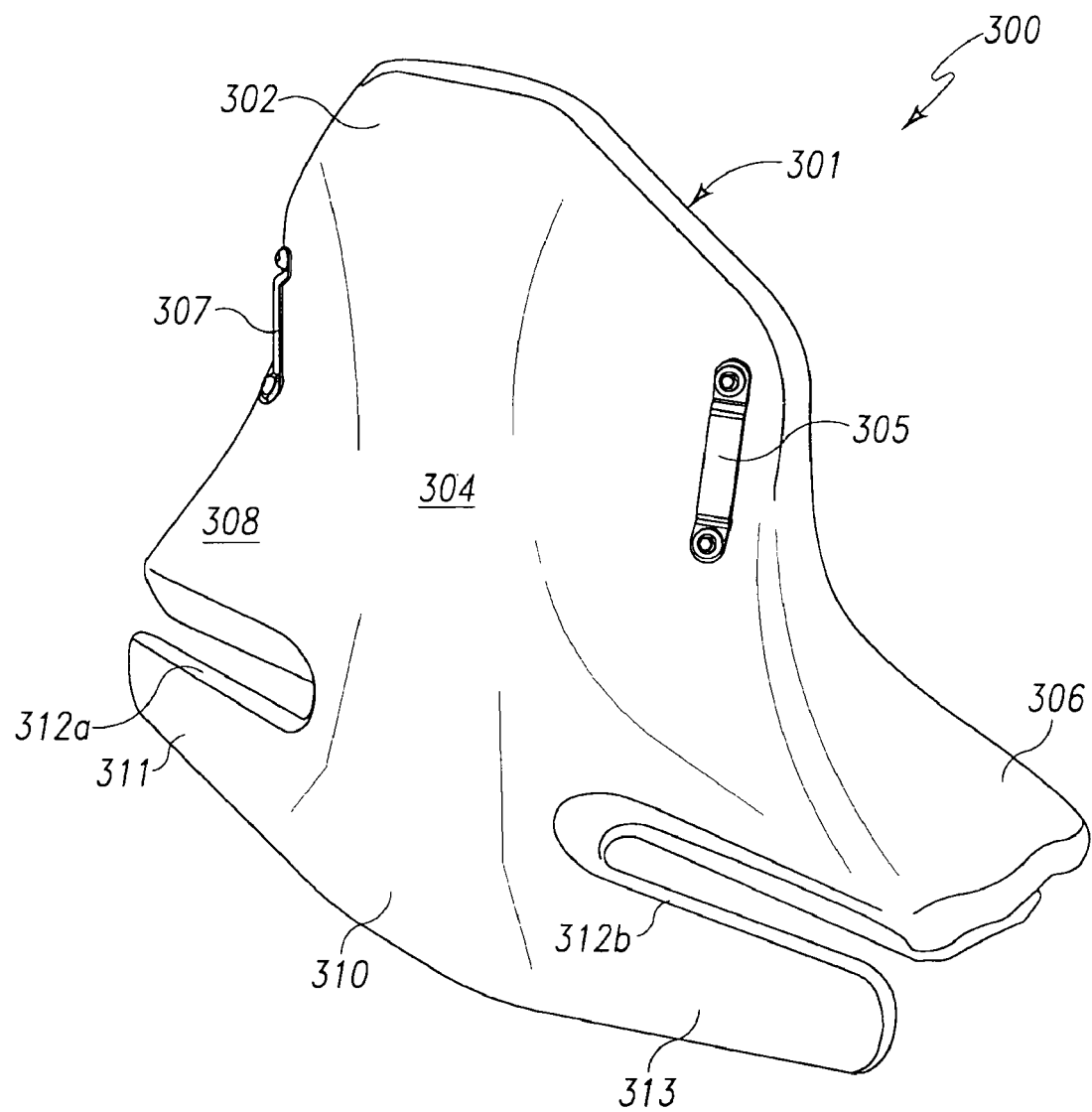
FIG. 12 is an upper rear right side perspective view of the head and neck restraint device of FIG. 10, the ride side relative to a user of the head and neck restraint device.
Figure 13:
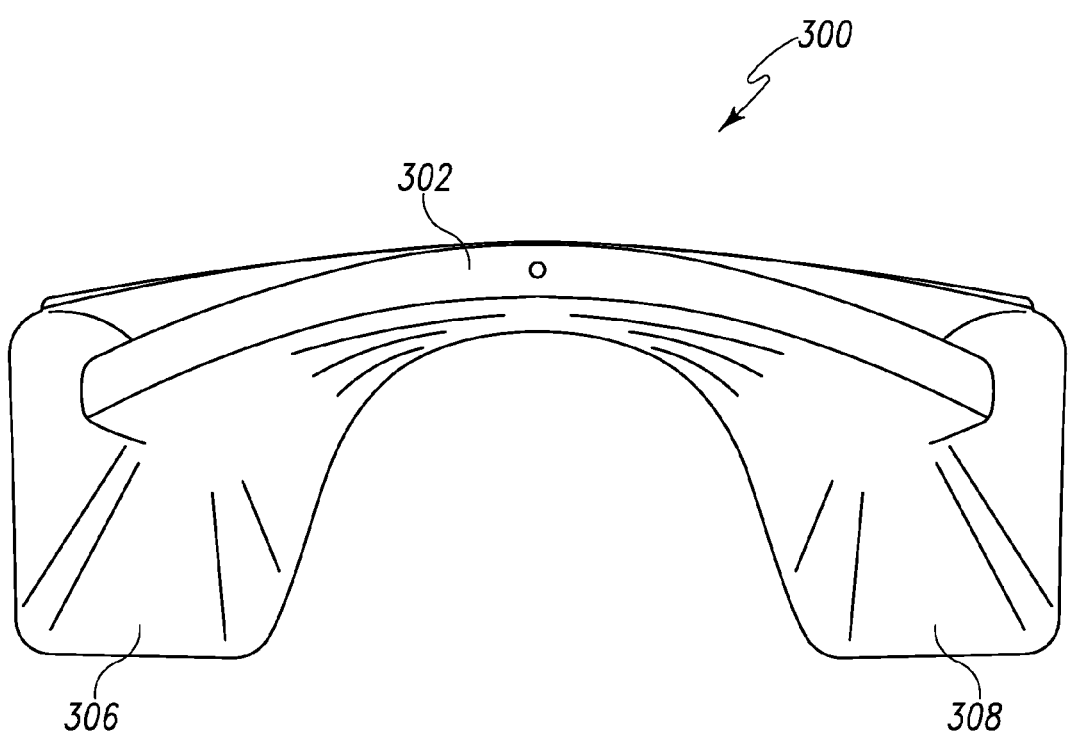
FIG. 13 is a top view of the head and neck restraint device of FIG. 10.

Referring to FIG. 11, the device 300 may have one or more brackets for holding and/or guiding a helmet tether. The body 301 has a right bracket 305 on the right rear of the collar 304 and a left bracket 307 on the left rear of the collar 304. The brackets are sized to receive a helmet tether and allow the tether to slide therethrough.

Figure 15:
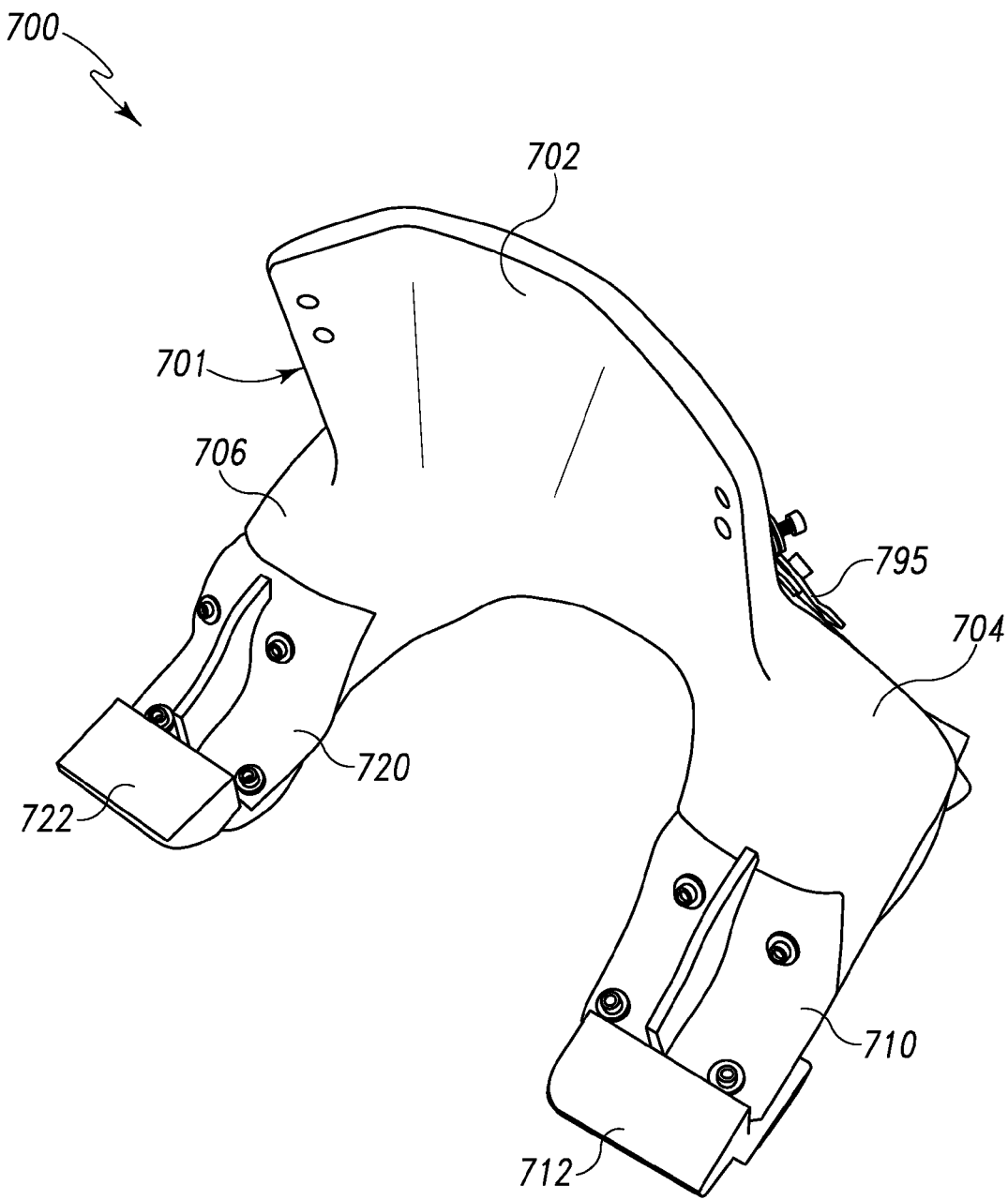
FIG. 15 is an upper front left side perspective view of another exemplary embodiment of a head and neck restraint device fashioned in accordance with the principles of the present invention, the left side relative to a user of the head and neck restraint device.
Figure 16:
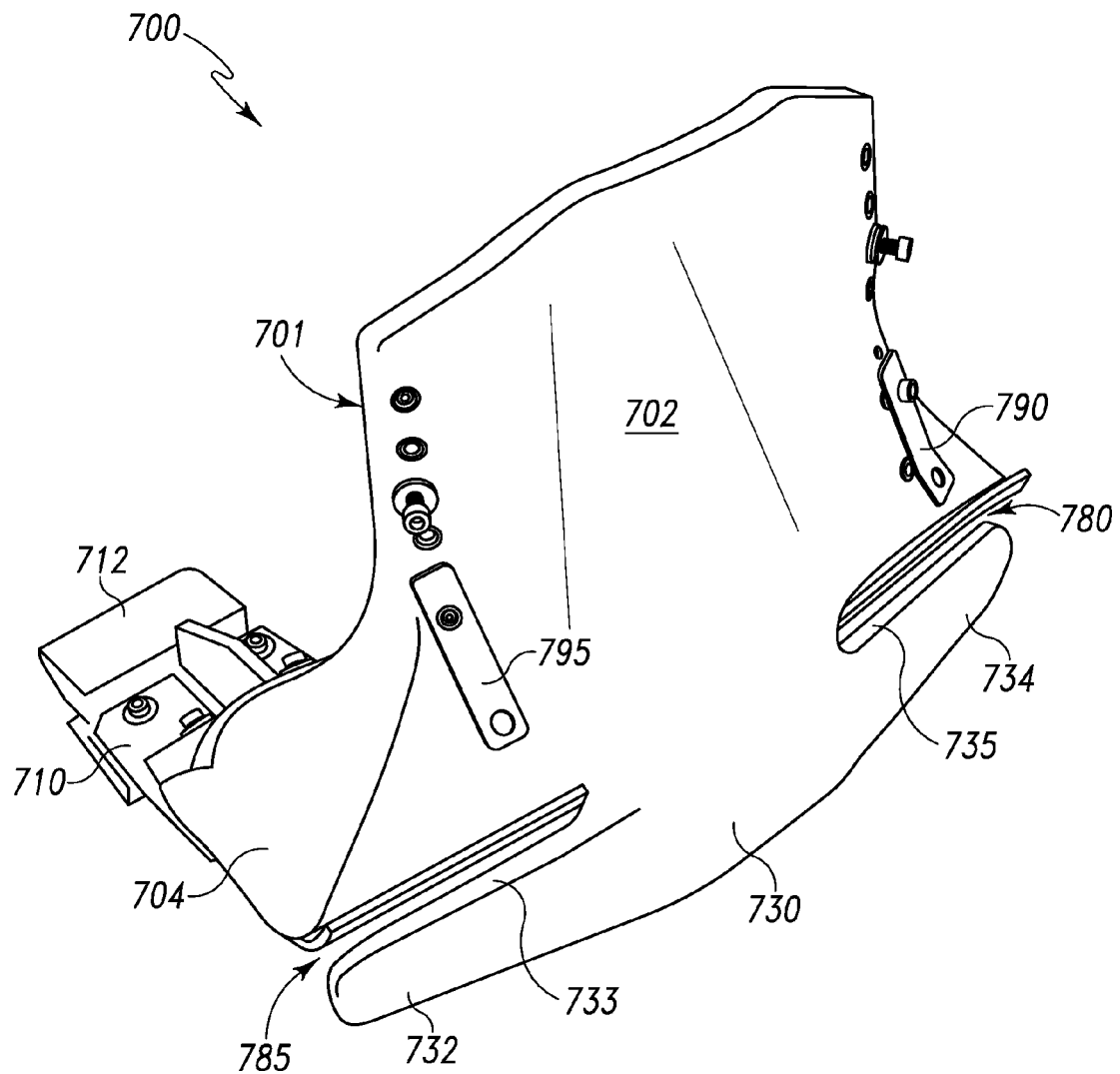
FIG. 16 is an upper rear left side perspective view of the head and neck restraint device of FIG. 15.

FIGS. 15 and 16 depict another exemplary embodiment of a head and neck restraint device, generally designated 700. The head and neck device 700 is formed as a one piece body 701. Preferably, but not necessarily, the body 701 is formed of a composite material or as a composite structure. This makes the device lightweight and durable.

The body 701 has a collar 702, a right leg 706 and a left leg 704. The right leg 706 is contoured on its underside to define a right belt pivot. The left leg 704 is contoured on its underside to define a left belt pivot. When the device 700 is used, the collar 702 is situated behind the occupant's head and is thus oriented essentially co-axial with the occupant's spine, the left leg 704 is oriented over the left shoulder adjacent the left side of the occupant's neck, and the right leg 706 is oriented over the right should adjacent the left side of the occupant's neck.

The device 700 further includes a belt interaction portion 730 that extends down from the bottom of the collar 702 and outwardly from the left and right sides thereof. The belt interaction portion 730 has a left wing 732 and a right wing 734 each having a respective contact surface 733, 735 on a respective upper area thereof. These contact surfaces 733, 735 are a friction and binding areas and are adapted to receive and contact a shoulder strap over the left and right wings. The left wing 732 and the left leg 704 together define a belt reception area 785. The right wing 734 and the right leg 706 together define a belt reception area 780.

The device 700 may have one or more brackets for holding and/or guiding a helmet tether. The device 700 is shown with a two brackets, particularly a right bracket 790 on the right rear of the collar 702, and a left bracket 765 on the left rear of the collar 702. The brackets are sized to receive a helmet tether and allow the tether to slide therethrough.

The device 700 has longer belt surfaces so consequently have longer legs. As such, the left leg 704 has a left extension or foot 710 with an adjustable toe piece 712. Likewise, the right leg 706 has a left extension or foot 720 with an adjustable toe piece 722. The left toe piece 712 includes a stop surface on the bottom thereof. The right toe piece 722 likewise includes a stop surface on the bottom thereof. The stop surfaces of the toes pieces limit the amount of forward pivoting of the device 700. It should be appreciated that the device 700 has features and thus functions in like manner to the other embodiments presented herein.

While the invention has been illustrated and described in detail in the drawings and foregoing description, the same is to be considered as illustrative and not restrictive in character, it being understood that only preferred embodiments have been shown and described and that all changes and modifications that come within the spirit of the invention are desired to be protected.

What is claimed is:

1. A device for controlling the motion of a helmeted head and forces exerted upon the neck of an occupant in a seat of a vehicle fitted with a seat harness with first and second shoulder straps, the device comprising:
   a rigid body defining a first side, a second side, and a vertical section extending between the first and second sides, the entire rigid body situated above first and second shoulders and aft of the helmeted head of the occupant;
   a first strap contact surface formed at a bottom surface of the first side and configured to lie upon an upper surface of the first shoulder strap of the seat harness above the first shoulder of the occupant;
   a second strap contact surface formed at a bottom surface of the second side and configured to lie upon an upper surface of the second shoulder strap of the seat harness above the second shoulder of the occupant;
   a first slot formed in the first side of the rigid body, the first slot defining a third strap contact surface on a first upper surface of a belt interaction portion of the rigid body at the lower side of the first slot and configured to lie below a lower surface of the first shoulder strap aft of the first strap contact surface;
   a second slot formed in the second side of the rigid body, the second slot defining a fourth strap contact surface on a second upper surface of the belt interaction portion of the rigid body at the lower side of the second slot and configured to lie below a lower surface of the second shoulder strap aft of the second strap contact surface; and
   a tether attached between the helmet of the occupant and the vertical section of the rigid body, the tether providing restraint of the helmet relative to the rigid body;
   wherein during deceleration of the occupant, forward motion of the helmeted head of the occupant causes the tether to pull against the vertical section of the rigid body which causes the first and third strap contact surfaces to transfer a first portion of the forward head and neck force to the first shoulder strap and the second and fourth strap contact surfaces to transfer a second portion of the forward head and neck force to the second shoulder strap.

2. The device of claim 1, wherein transfer of the forward motion of the helmeted head of the occupant during deceleration of the occupant to the first and second shoulder straps is accomplished through a cantilever motion of the rigid body on the first and second shoulder straps.

3. The device of claim 2, wherein the cantilever motion is defined between the first and third contact surfaces, and the second and fourth contact surfaces.

4. The device of claim 1, wherein transfer of the forward motion of the helmeted head of the occupant during deceleration of the occupant to the first and second shoulder straps is accomplished through a twisting motion of the rigid body on the first and second shoulder straps.

5. The device of claim 4, wherein the twisting motion is defined between the first and third contact surfaces, and the second and fourth contact surfaces.

6. The device of claim 1, wherein transfer of the forward motion of the helmeted head of the occupant during deceleration of the occupant to the first and second shoulder straps is accomplished through a sliding motion of the rigid body on the first and second shoulder straps.

7. The device of claim 1, wherein the rigid body is formed of a composite.

8. The device of claim 1, wherein the rigid body rests only on the first and second shoulder straps and does not touch the occupant during normal operation.

9. A device for controlling the motion of a helmeted head and forces exerted upon the neck of an occupant in a seat of a vehicle fitted with a seat harness with first and second shoulder straps, the device comprising:
- a rigid body defining a first side, a second side, and a vertical section extending between the first and second sides, the entire rigid body situated above first and second shoulders and aft of the helmeted head of the occupant;
- a first strap contact surface formed at a bottom surface of the first side and configured to lie upon an upper surface of the first shoulder strap of the seat harness above the first shoulder of the occupant;
- a second strap contact surface formed at a bottom surface of the second side and configured to lie upon an upper surface of the second shoulder strap of the seat harness above the second shoulder of the occupant;
- a first slot formed in the first side of the rigid body, the first slot defining a third strap contact surface on a first upper surface of a belt interaction portion of the rigid body at the lower side of the first slot and configured to lie below a lower surface of the first shoulder strap aft of the first strap contact surface;
- a second slot formed in the second side of the rigid body, the second slot defining a fourth strap contact surface on a second upper surface of the belt interaction portion of the rigid body at the lower side of the second slot and configured to lie below a lower surface of the second shoulder strap aft of the second strap contact surface; and
- a tether attachable at a first side of the helmet of the occupant above the first shoulder strap and at a second side of the helmet of the occupant above the second shoulder strap, the tether providing restraint of the helmet relative to the rigid body and extending from the vertical section such that the helmet is free to turn to right and left sides through tether movement relative to the vertical section;
- wherein during deceleration of the occupant, forward motion of the helmeted head of the occupant causes the tether to pull against the vertical section of the rigid body which causes the first and third strap contact surfaces to transfer a first portion of the forward head and neck force to the first shoulder strap and the second and fourth strap contact surfaces to transfer a second portion of the forward head and neck force to the second shoulder strap.

10. The device of claim 9, wherein the tether is restrained to the vertical section about a rear side of the vertical section and allowed to move freely relative to the vertical section.

11. The device of claim 9, wherein transfer of the forward motion of the helmeted head of the occupant during deceleration of the occupant to the first and second shoulder straps is accomplished through a cantilever motion of the rigid body on the first and second shoulder straps.

12. The device of claim 11, wherein the cantilever motion is defined between the first and third contact surfaces, and the second and fourth contact surfaces.

13. The device of claim 9, wherein transfer of the forward motion of the helmeted head of the occupant during deceleration of the occupant to the first and second shoulder straps is accomplished through a twisting motion of the rigid body on the first and second shoulder straps.

14. The device of claim 13, wherein the twisting motion is defined between the first and third contact surfaces, and the second and fourth contact surfaces.

15. The device of claim 9, wherein transfer of the forward motion of the helmeted head of the occupant during deceleration of the occupant to the first and second shoulder straps is accomplished through a sliding motion of the rigid body on the first and second shoulder straps.

16. The device of claim 9, wherein the rigid body is formed of a composite.

17. The device of claim 9, wherein the rigid body rests only on the first and second shoulder straps and does not touch the occupant during normal operation.

18. A device for controlling the motion of a helmeted head and forces exerted upon the neck of an occupant in a seat of a vehicle fitted with a seat harness with first and second shoulder straps, the device comprising:
- a rigid body configured to be entirely situated above first and second shoulders and aft of the helmeted head of the occupant;
- a first strap contact surface formed at a first bottom area of the rigid body and configured to lie upon an upper surface of the first shoulder strap above the first shoulder of the occupant;
- a second strap contact surface formed at a second bottom area of the rigid body and configured to lie upon an upper surface of the second shoulder strap above the second shoulder of the occupant;
- a first horizontal member formed in a first side of the rigid body, the first horizontal member defining a third strap contact surface configured to lie below a lower surface of the first shoulder strap aft of the first strap contact surface;
- a second horizontal member formed in a second side of the rigid body, the second horizontal member defining a fourth strap contact surface configured to lie below a lower surface of the second shoulder strap aft of the second strap contact surface; and
- a tether attached between the helmet of the occupant and a vertical section of the rigid body, the tether providing restraint of the helmet relative to the rigid body;
- wherein during deceleration of the occupant, forward motion of the helmeted head of the occupant causes the tether to pull against the vertical section of the rigid body which causes the first and third strap contact surfaces to transfer a first portion of the forward head and neck force to the first shoulder strap and the second and fourth strap contact surfaces to transfer a second portion of the forward head and neck force to the second shoulder strap.

19. The device of claim 18, wherein transfer of the forward motion of the helmeted head of the occupant during deceleration of the occupant to the first and second shoulder straps is accomplished through a cantilever motion of the rigid body on the first and second shoulder straps.

20. The device of claim 18, wherein transfer of the forward motion of the helmeted head of the occupant during deceleration of the occupant to the first and second shoulder straps is accomplished through a twisting motion of the rigid body on the first and second shoulder straps.

21. The device of claim 18, wherein transfer of the forward motion of the helmeted head of the occupant during deceleration of the occupant to the first and second shoulder straps is accomplished through a pivoting motion of the rigid body on the first and second shoulder straps.

* * * * *